(12) United States Patent
Brower et al.

(10) Patent No.: US 8,566,182 B2
(45) Date of Patent: Oct. 22, 2013

(54) ENTERPRISE ASSET MANAGEMENT

(75) Inventors: Cheryl Brower, Murphy, TX (US); Gaylen M. Landau-Hubbard, Flower Mound, TX (US); Sandra R. Morgan, Davison, MI (US); Michael Whalley, Manly (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 1028 days.

(21) Appl. No.: 12/188,090

(22) Filed: Aug. 7, 2008

(65) Prior Publication Data

US 2010/0023415 A1    Jan. 28, 2010

Related U.S. Application Data

(63) Continuation of application No. 12/180,703, filed on Jul. 28, 2008.

(51) Int. Cl.
*G06Q 10/00*    (2012.01)

(52) U.S. Cl.
USPC ........................................... 705/28; 705/26.1

(58) Field of Classification Search
USPC .......... 379/114.01; 700/65; 701/35; 705/1, 7, 705/8, 14, 27, 28, 30, 51, 54, 78; 713/153, 713/158
See application file for complete search history.

(56) References Cited

U.S. PATENT DOCUMENTS

| | | | |
|---|---|---|---|
| 7,117,169 B2* | 10/2006 | Zara et al. .................... | 705/28 |
| 7,124,101 B1 | 10/2006 | Mikurak | |
| 2002/0032626 A1 | 3/2002 | DeWolf et al. | |
| 2002/0111884 A1 | 8/2002 | Groat et al. | |
| 2003/0055749 A1 | 3/2003 | Carmody et al. | |
| 2003/0182206 A1* | 9/2003 | Hendrix et al. ................ | 705/26 |
| 2004/0177032 A1 | 9/2004 | Bradley et al. | |
| 2004/0254863 A1 | 12/2004 | Jones et al. | |
| 2006/0031259 A1 | 2/2006 | Gibson et al. | |
| 2006/0095367 A1 | 5/2006 | Iverson | |
| 2006/0095372 A1 | 5/2006 | Venkatasubramanian et al. | |
| 2008/0205612 A1* | 8/2008 | Lopez ...................... | 379/114.01 |

OTHER PUBLICATIONS

U.S. Appl. No. 12/180,703, filed Jul. 28, 2008, entitled Enterprise Asset Management, Inventors Cheryl Brower et al. (Total 32 pages including specification, claims and drawings).

* cited by examiner

*Primary Examiner* — Scott Zare
*Assistant Examiner* — Rokib Masud

(57) ABSTRACT

Systems, methods, and apparatus, including software tangibly stored on a computer readable medium, involve managing assets of an enterprise. A purchase order requesting a good or a service of an enterprise is received. A particular asset for use in providing the good or the service is identified. An electronic asset record associated with the particular asset is modified to include information relating to the purchase order. Invoice data for requesting payment for the good or the service requested in the purchase order is generated. The invoice data is verified based at least in part on the modified electronic asset record.

20 Claims, 5 Drawing Sheets

ENTERPRISE ASSET MANAGEMENT

This application is a continuation of and claims the benefit of co-pending application Ser. No. 12/180,703, filed Jul. 28, 2008, entitled "Enterprise Asset Management," which is incorporated herein by reference.

BACKGROUND

This description relates to managing assets, and in particular, to managing assets in an enterprise.

An enterprise, such as a business, an organization, or an individual, may utilize various assets in conducting enterprise operations. For example, assets can include information technology, industrial equipment, laboratory systems, office equipment, and a variety of other items used for enterprise operations. In some cases, an asset is used for multiple different projects, in multiple different cost centers, by multiple different users. A physical location, status, and/or other attributes of an asset may change one or more times before the asset is retired.

In some cases, an enterprise uses or obtains assets based on a particular request for a good or service provided by the enterprise. For example, a client may request a particular good or service provided by the enterprise, and the enterprise may purchase and/or use one or more assets to provide the particular good or service requested by the client. The enterprise may then request payment from the client for delivery of the particular good or service.

SUMMARY

In one general aspect, a purchase order requesting a good or a service of all enterprise is received, and a particular asset for use in providing the good or the service is identified. An electronic asset record associated with the particular asset is modified to include information relating to the purchase order. Invoice data for requesting payment for the good or the service requested in the purchase order is generated. The invoice data is verified based at least in part on the modified electronic asset record.

Implementations can include one or more of the following features. The information relating to the purchase order includes a purchase order number associated with the purchase order, and the asset record is located based on the purchase order number. The electronic asset record is modified by generating the electronic asset record and storing the information relating to the purchase order in the electronic asset record. In addition or alternatively, the electronic asset record is modified to include a date associated with the usage, a time associated with the usage, an enterprise entity associated with the usage, a result of the usage, and/or all authorizer of the usage. The invoice data is verified by identifying at least one specific time when the particular asset was used in providing the good or the service, comparing the invoice data to data included in the modified electronic asset record and/or data included in the purchase order, and/or in response to a request received from a client that submitted the purchase order. A report is generated, and the report provides details of the usage of the particular asset based on the electronic asset record. The invoice data can also be verified by verifying the accuracy of a purchase order number, a date of the asset usage, a currency type, a currency amount, and/or a total contract value. An alert is issued when an inaccuracy is identified in the invoice data. The invoice data is generated in response to receiving a goods or services receipt notification. The electronic asset record and multiple additional electronic asset records are identified based on the information relating to the purchase order. The additional electronic asset records are associated with multiple additional assets. The invoice data is modified based on a result of verifying the invoice data. The purchase order data and/or the invoice data are received over a private network and/or over a public network. The described techniques can be implemented in methods, systems, apparatus, computer program products, or otherwise, tangibly stored on a computer readable medium as instructions operable to cause programmable processor to perform actions.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
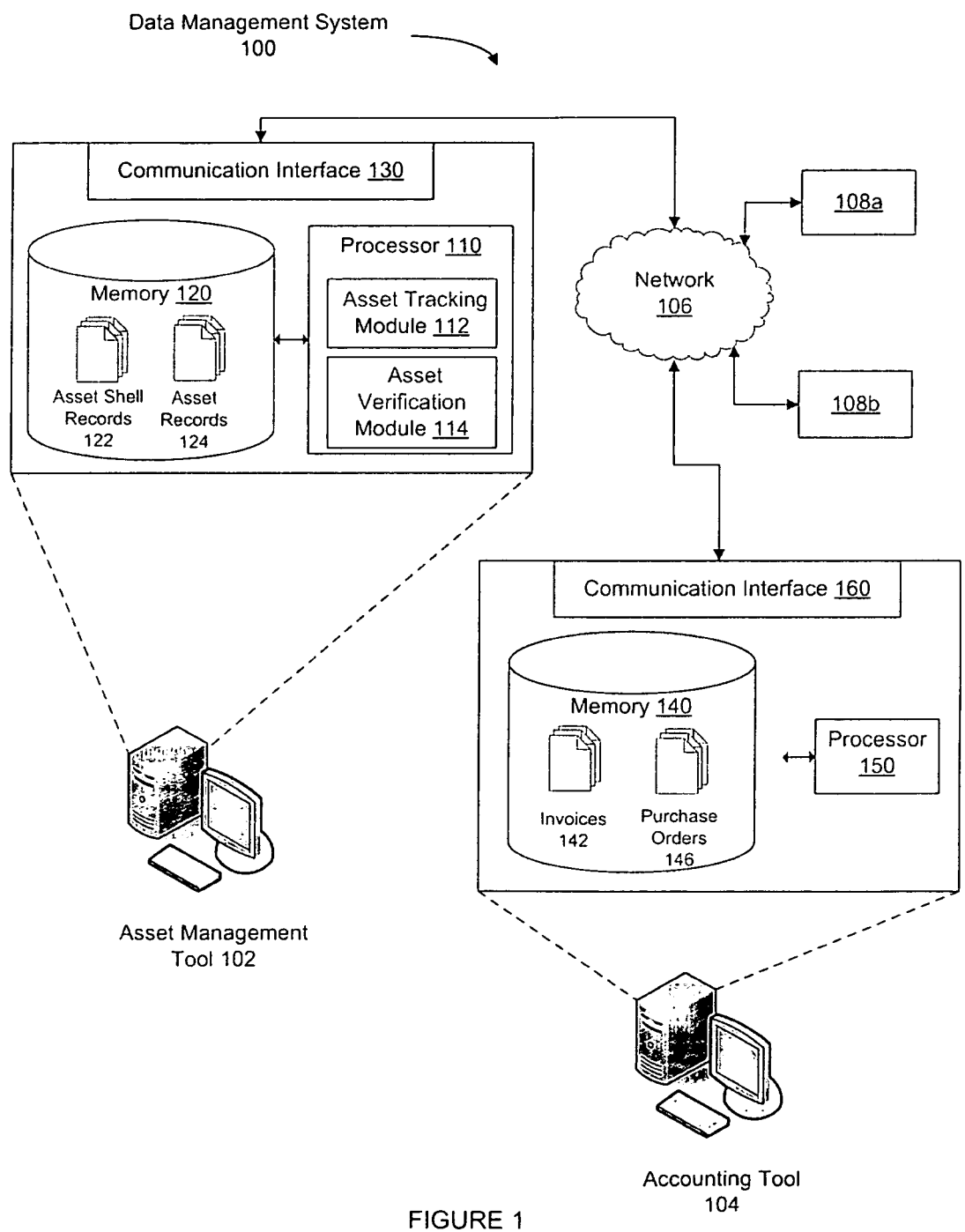
FIG. 1 is a block diagram illustrating an example asset management tool.

FIG. 1 is a block diagram illustrating an example data management system 100 that can be used for asset management in an enterprise. Before a particular asset is received by the enterprise, the data management system 100 can generate an electronic asset record for tracking the particular asset. The electronic asset record can be used to track the particular asset before and after the enterprise receives the particular asset. The data management system 100 can automatically and/or periodically update the asset record, for example, to maintain an auditable record of the particular asset. The electronic asset record can be used to verify use of the asset and/or to verify information included in an invoice requesting payment for use of the asset. For example, the electronic asset record can include information regarding use of a particular asset, such as a purchase order number associated with a specific instance of use of the particular asset. When an invoice associated with the purchase order number is generated to request payment for use of the asset or in response to a customer inquiry, the data management system 100 can verify the invoice data based on the electronic asset record.

The data management system 100 can be used to manage many different types of assets. In some implementations, assets include information technology assets, industrial equipment, laboratory systems, office equipment, and a variety of other physical items used for enterprise operations. Specific examples of assets include a router, a server, a printer, a photocopier, a scanner, a cellular phone, an air compressor, a motor, a generator, a camera, a flow meter, a forklift, a scale, a barcode scanner, a cash register, a piece of furniture, and others.

The example data management system 100 includes an asset management tool 102 and an accounting tool 104 communicatively coupled over a network 106. The asset management tool 102 and the accounting tool 104 can communicate with additional enterprise information systems 108a and/or external systems 108b. The network 106 can be implemented as any form or medium of digital data communication, such as a communication network. Examples of communication networks include a local area network ("LAN") and a wide area network ("WAN"), for example, the Internet.

The asset management tool 102 includes a central processor 110, which executes programs, performs data manipulations, and controls tasks in the asset management tool 102. The illustrated example processor 110 includes an asset tracking module 112 and an asset verification module 114. The asset management tool 102 includes a memory 120, which can be volatile and/or non-volatile memory, and is used to store data related to asset management. The illustrated example memory 120 stores asset shell records 122, asset records 124, and other data. The processor 110 is coupled with the memory 120, for example, through a bus that can include multiple busses, which may be parallel and/or serial busses. The illustrated asset management tool 102 further includes a communication interface 130, which allows software and data to be communicated over the network 106, for example, to or from the accounting tool 104, the additional enterprise information systems 108a and/or the external systems 108b.

The accounting tool 104 includes a central processor 150, which executes programs, performs data manipulations, and controls tasks in the accounting tool 104. The accounting tool 104 includes a memory 140, which can be volatile and/or non-volatile memory, and is used to store data related to enterprise accounting activities. The illustrated example memory 140 stores invoices 142, purchase orders 146, and other data. The processor 150 is coupled with the memory 140, for example, through a bus that can include multiple busses, which may be parallel and/or serial busses. The illustrated accounting tool 104 further includes a communication interface 160, which allows software and data to be communicated over the network 106, for example, to or from the asset management tool 102, the additional enterprise information systems 108a and/or the external systems 108b.

The asset management tool 102 and/or the accounting tool 104 can also include one or more cache memories. The asset management tool 102 and/or the accounting tool 104 can each include a storage device for accessing a storage medium, which may be removable, read-only, or read/write media and may be magnetic-based, optical-based, semiconductor-based media, or a combination of these. The asset management tool 102 and/or the accounting tool 104 can also include one or more peripheral devices, and one or more controllers and/or adapters for providing interface functions.

The asset management tool 102 and the accounting tool 104 each represent one or more programmable machines, and can include various devices such as embedded controllers, Programmable Logic Devices (PLDs), Application Specific Integrated Circuits (ASICs), and the like. Machine instructions (also known as programs, software, software applications or code) can be stored in and/or delivered to the one or both tools 102 and 104 over the communication interfaces 130 and 160, respectively. These instructions, when executed, enable the tools 102 and 104 to perform the features and functions described herein. These instructions represent controllers of the machine 100 and can be implemented in a high-level procedural and/or object-oriented programming language, and/or in assembly/machine language. Such languages can be compiled and/or interpreted languages.

The example purchase orders 146 include electronic data related to requests for goods and/or services. Purchase orders can include client purchase orders and enterprise purchase orders. A client purchase order 146 can be received by the enterprise from a client of the enterprise. A client purchase order 146 includes details related to goods or services to be provided to the client by the enterprise. An enterprise purchase order 146 can be sent to a vendor from the enterprise. An enterprise purchase order 146 includes details related to goods or services to be provided to the enterprise by the vendor. Examples of details included in a purchase order 146 include an identification of a client, a vendor, the enterprise, entities and/or assets of the enterprise, a requested good or service, an anticipated delivery date, a delivery deadline, a price of the requested good or service, an identification of a currency type (e.g., U.S. dollars, Canadian dollars, Euros, Yen, and/or others), a project budget, and/or other information. Individual goods and/or services may be requested, for example, as line items in a purchase order 146. For example, a line item of a purchase order 146 may request ten computer monitors having a given model number. The example purchase order 146 may additionally identify a requested delivery date for the ten computer monitors, a date on which the purchase order 146 was generated or transmitted, a price for the computer monitors, and/or other data. Each enterprise purchase order 146 may include or otherwise be associated with a client purchase order number.

The example invoices 142 include electronic data related to requests for payment for goods and/or services provided by the enterprise. An invoice 142 can be sent to a client when a client purchase order or a request included in a client purchase order has been fulfilled. An invoice 142 can be generated when a goods and services receipt notification is received (e.g., by the accounting tool 104), indicating that the client has received the requested goods and services. In some cases, an invoice 142 identifies one or more enterprise assets used and/or purchased in order to fulfill the client purchase order request. Each invoice 142 may include or otherwise be associated with a purchase order number. A line item of an invoice 142 can identify a specific good or service provided by the enterprise. For example, a line item of an invoice 142 may indicate five desktop PC bundles.

The example asset shell records 122 include asset tracking data that is not associated with specific enterprise assets. When an asset is ordered by the enterprise, an asset shell record 122 is generated, for example, based on an enterprise purchase order 146 requesting an asset from a vendor. The enterprise can send an enterprise purchase order 146 to a vendor and the asset shell record 122 can include information included in the enterprise purchase order. The asset shell record 122 can identify the asset ordered, a part or model number of the ordered asset, a manufacturer of the ordered asset, a deadline for receiving the asset, and/or other data. The asset shell record 122 may also include data associating the ordered asset with a particular client, project, service, or other client deliverable.

The example asset records 124 include asset tracking data associated with specific enterprise assets. An asset shell record 122 can be converted to an asset record 124, for example, when the asset shell record 122 is associated with the specific enterprise asset. Associating an asset shell record 122 with a specific enterprise asset can include modifying the asset shell record 122 to include information about the specific enterprise asset. For example, the information can include a serial number of the specific asset, an anticipated delivery date of the specific asset, an anticipated delivery location of the specific asset, and/or other data. In some cases, the enterprise receives the information about the specific asset before the enterprise receives the specific asset. Accordingly, the asset record 124 can be associated with the specific asset before the enterprise receives the specific asset. For example, a vendor can send to the enterprise an identification of a serial number of a specific asset, where the specific asset is selected by the vendor in response to an enterprise purchase order sent to the vendor from the enterprise. An asset record 124 can be associated with the particular asset by including in the asset record 124 the identification of the serial number of the specific asset selected by the vendor.

Additional information can be added to the asset record 124, for example, after the specific asset is received by the enterprise. The asset record 124 can be used to track the specific asset over the lifetime of the specific asset. For example, the asset record 124 can be used to log information about the specific asset until the asset is no longer in use or is no longer deployed by the enterprise. In some implementations, the asset record 124 is used to record a deployment location of the specific asset, a cost center associated with the specific asset, a parent asset associated with the specific asset, a child asset associated with the specific asset, a status of the specific asset, a time when the specific asset is due for servicing, an update performed on the specific asset, depreciation of the specific asset, an instance of usage of the specific asset, a deployment date of the specific asset, and/or other data.

For example, if an asset record 124 is associated with a specific network server, the asset record 124 may identify a model number of the server, a manufacturer of the server, a serial number of the server, a memory capacity of the server, a vendor who provided the server, a client or client purchase order associated with the server, and/or other data. The asset record 124 can include current and historic information related to parent network nodes of the server, child network nodes of the server, deployment locations of the server. IP addresses of the server, a status of the server, usage of the server, updates performed to the server, an operating system and/or operating system version run by the server, and/or other data. The status of the server can identify, for example, active status, inactive status, retired status, obsolete status, in storage status, or another status. The usage data can include purchase order numbers associated with one or more instances of use of the server, a user of the asset, an amount of time the asset was used, a result of the usage, and/or other information.

The asset tracking module 112 generates and maintains asset shell records 122 and asset records 124. The asset tracking module 112 can generate asset shell records 122 based on an enterprise purchase order 146, an internal enterprise sales order, and/or other data. The asset tracking module 112 can associate an asset shell record 122 with a specific asset, for example, based on information about the specific asset. The information can include information received from a vendor who selects the specific asset in response to a request for an asset included in an enterprise purchase order 146 sent to the vendor from the enterprise. The asset tracking module 112 can automatically and/or periodically update asset records 124. The asset tracking module 112 can update asset records 124 based on data entered manually, data received over a network connection, and/or data uploaded using a storage device. For example, the asset tracking module 112 can update an asset record 124 based on data entered manually by a project manager regarding usage of the asset. The asset tracking module 112 can generate, modify, and/or update an asset record 124 to include any of the information included in the asset records 124, as described herein.

The asset verification module 114 verifies data included in invoices 142 or other documents and communications based on data included in asset records 124 and/or purchase orders 146. In an example implementation, a client submits to the enterprise a client purchase order 146 requesting a service of the enterprise, the enterprise provides the requested service to the client, and an invoice 142 is generated requesting payment from the client. The asset verification module 114 can verify the accuracy of the data included in the invoice 142. For example, the asset verification module 114 can identify the specific assets used to perform the service requested in the purchase order 146. The asset verification module 114 can identify when a specific asset was used (e.g., dates and/or times), an enterprise entity who authorized and/or supervised usage of the specific asset, a result of the asset usage, an amount of money charged for the asset use, a currency type, and/or other data.

In some implementations, the asset verification module 114 receives an identification of a purchase order number and/or other information associated with an invoice 142 from the accounting tool 104, or another enterprise information system 108*a*. The asset verification module 114 searches for (or otherwise identifies) one or more asset records 124 associated with the purchase order number. The asset verification module 114 can identify particular instances of usage of specific assets associated with the asset records 124 identified by the search. The asset verification module 114 can verify the accuracy of invoice data by comparing the invoice data to data included in the identified asset records 124. The asset verification module 114 can reply to the accounting tool 104, or another enterprise information system 108*a*, with specific information about asset usage associated with the purchase order number.

In some implementations, the asset verification module 114 identifies inaccuracies in invoice data. For example, the asset verification module 114 may identify that a specific instance of asset usage was billed twice by mistake, or the asset verification module 114 may identify that a specific instance of asset usage was billed in the wrong currency type or in excess of a pre-set budget. In such a case, the asset verification module 114 can issue an alert, for example, to notify systems and/or personnel of the inaccuracy. In addition, the identified inaccuracies can be communicated to the accounting tool 104, and further action can be taken. For example the invoice may be modified based on the inaccuracies identified by the asset verification module 114.

The illustrated data management system 100 is an example system for managing assets in an enterprise. Other implementations of a data management system 100 can include one or more variations. The memories 120 and 140 can additionally store other data related to accounting and/or asset management. For example, one or both of the memories 120 and 140 may additionally store asset record audit data, invoice audit data, goods and services receipt notifications, and/or other data. In some implementations, some or all of the asset management data is stored on a remote system (e.g., enterprise information systems 110*a* and/or external systems 108*b*) and/or on a storage medium accessed by a local storage device. For example, one or more of the asset shell records 122, the asset records 124, the purchase orders 146, the invoices 142, and other data can be stored on an enterprise information system 108*a* and retrieved via the network 106. The processors 110 and 150 can additionally perform other operations related to accounting and/or asset management. For example, one or both of the processors 110 and 150 may issue alerts, present interface tools, perform sort and/or search functions, and/or other operations. In some implementations, the functionality described with respect to the asset tracking module 112, the asset verification module 114, and/or other aspects of the processor 110 is performed by a single processor module or multiple different processor modules implemented on a local and/or remote systems. One or more aspects of operation can be performed by a server, and the server can be accessed over the network 106 from a remote interface.

Figure 2:
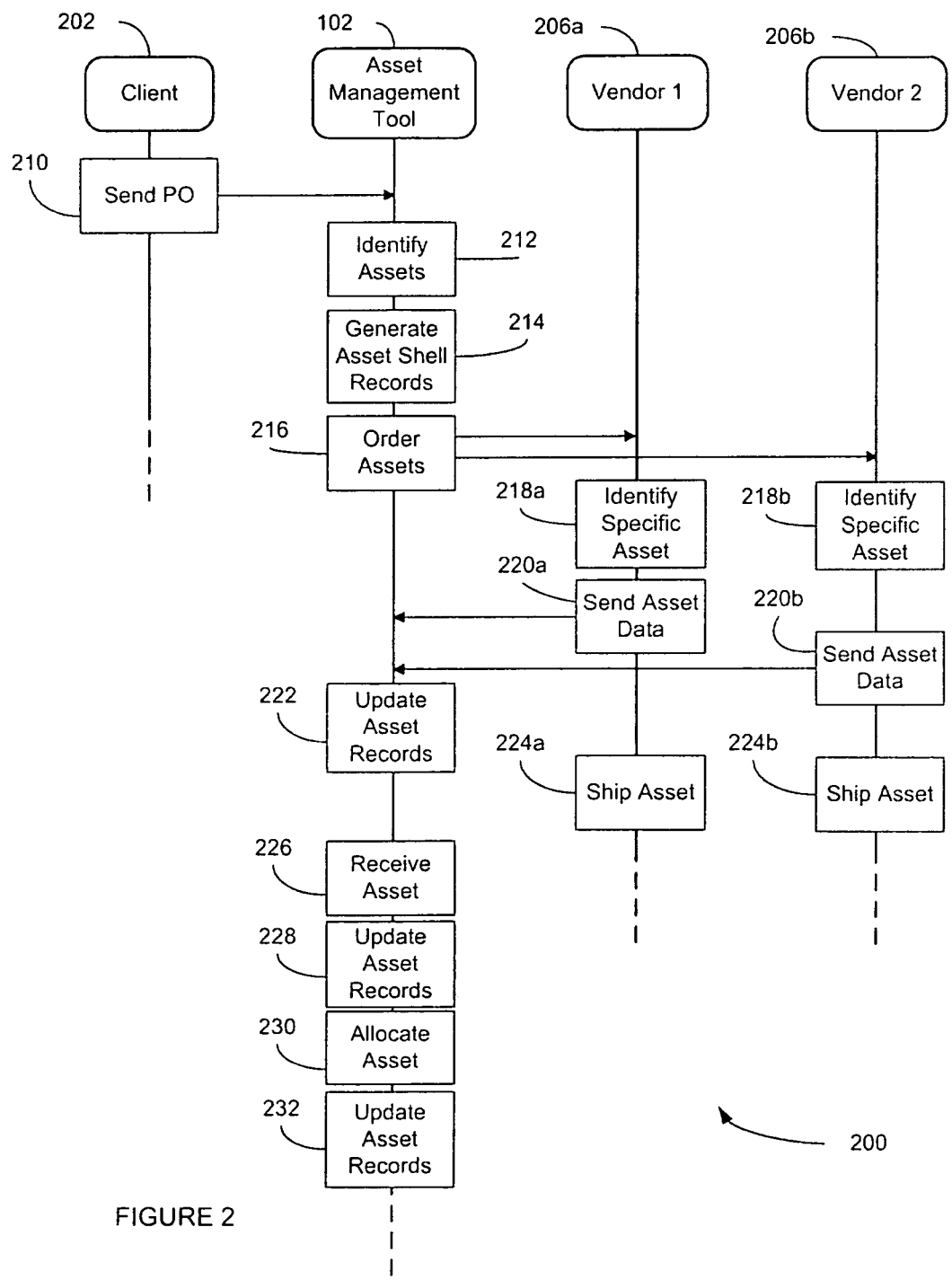
FIG. 2 is a signaling diagram illustrating an example implementation of asset tracking.

FIG. 2 is a signaling diagram 200 illustrating an example implementation of asset tracking. The signaling diagram 200 illustrates an example timeline of communication among a client 202, an asset management tool 102, a first vendor 206a, and second vendor 206b. Each of the illustrated entities can exchange information using a network communication protocol. For example, the entities may communicate over the network 106 of FIG. 1 using a TCP/IP protocol or a different communication protocol. In some cases, two or more of the entities are communicatively coupled over the Internet, a private network, or a different network (e.g., a LAN or a WAN). Communication can include wired (e.g., electrical, optical, and/or another) and/or wireless (e.g., radio frequency, infrared, and/or another) communication. Communication may use electronic data interchange (EDI) or other electronic formats. Communication can include non-automated communication. For example, in some cases a purchase order, a sales order, and/or other data is communicated verbally or in a written request. Such data can then be converted to machine-readable format (e.g., by a scanning and optical character recognition, manual entry, or another technique).

The client 202 can include an information system, such as a purchasing tool or an accounting tool, of a client entity. The client entity can be an internal entity of the enterprise. Example internal entities of an enterprise include individuals (e.g., a project manager, a technician, a supervisor, or another individual), departments (e.g., marketing department, information technology department, research department, or another department), offices (e.g., Los Angeles office, downtown office, or another office), teams (e.g., development team, quality control team, software team, or another team), groups, boards, committees, panels, and others. The client entity can be an entity external to the enterprise. Example entities external to an enterprise include individuals, companies, businesses, partnerships, associations, municipalities, and other external enterprises, in addition to the entities (e.g., individuals, departments, etc.) that make up the external enterprises.

The client 202 requests a good or a service of the enterprise by generating a client purchase order. For example, the request can be a line item of the client purchase order. At 210, the purchase order is transmitted from the client 202 to the asset management tool 102. The purchase order data can be received either directly or indirectly by the asset management tool 102. For example, the accounting tool 104, a project management tool (illustrated in FIG. 3), or another enterprise information system may receive the purchase order directly from the client 202 and then re-transmit the purchase order data to the asset management tool 102.

At 212, the asset management tool 102 identifies assets to be used for delivering the good or service requested in the client purchase order. In some implementations, one or more of the identified assets can be ordered from vendors. In the illustrated example, identified assets are ordered from the first vendor 206a and the second vendor 206b. Vendor 206 can represent an information system, such as a sales tool or an accounting tool, of a vendor entity. A vendor entity can supply assets to the enterprise. For example, a vendor entity can be an individual, a company, a manufacturer, a distributor, service provider, or another entity (internal or external to the enterprise) that sells or otherwise provides assets used for enterprise operations.

At 214, an asset shell record is generated for each identified asset. Each asset shell record may include an identification (e.g., manufacturer, part number, model number, or other data) of one of the assets to be ordered from the vendors 206. At 216, the identified assets are ordered from the first vendor 206a and the second vendor 206b. In some cases, the assets are ordered by sending the vendors 206 an enterprise purchase order (distinct from the client purchase order sent by the client 202).

At 218a and 218b, the first vendor 206a and the second vendor 206b each identify specific assets in response to the orders received from the asset management tool 102. For example, if the order for the asset requests a specific brand and model number of printer, the vendor 206a may identify a specific printer having the brand and model number. The specific printer may be identified by a serial number, a location, a box number, or another type of identifier.

At 220a and 220b, the first vendor 206a and the second vendor 206b each send to the asset management tool 102 data related to the specific assets that were identified in response to the orders received from the asset management tool 102. For example, the asset data can include the serial number of the specific assets identified. As another example, the asset data can include an anticipated delivery location and/or delivery date. At 222, the asset records are associated with the specific assets when the asset records are updated with the asset data received from the vendors 206. The operation 222 can be performed either before or after the assets are received by the enterprise.

At 224a and 224b, the first vendor 206a and the second vendor 206b each provide the specific assets identified in response to the orders received from the asset management tool 102. For example, the specific assets may be shipped or otherwise delivered to a location associated with the enterprise. At 226, the specific assets are received by the enterprise. At 228, after the specific assets are received, the asset records are modified to include additional information about the specific assets.

At 230, the specific assets are allocated in the enterprise. For example, the specific assets may be distributed to the various enterprise entities that requested the specific assets, to the various locations where the specific assets will be deployed, and/or to the various entities that will use the specific assets to fulfill the request included in the client purchase order.

At 232, the asset management tool 102 updates the asset records, for example, with information related to the allocation of the specific assets at 230. The asset records can be updated over the lifetime of specific assets, for example, until the specific assets are retired from use. An asset can be retired, for example, when it no longer functions as intended, when it is no longer needed for enterprise operations, when it becomes obsolete, when it is sold by the enterprise, or at another time. Modifying an asset record can include modifying the asset record to include an identification that the specific asset has been retired.

The illustrated signaling diagram 200 is an example implementation, and other implementations include one or more variations. For example, a different number (e.g., one, two, four, or more) of vendors 206, clients 202, and other entities can communicate with the asset management tool 102. The asset records can be updated multiple times before and/or after the assets are received, or the asset records can be updated for the first time after the assets are received.

Figure 3:
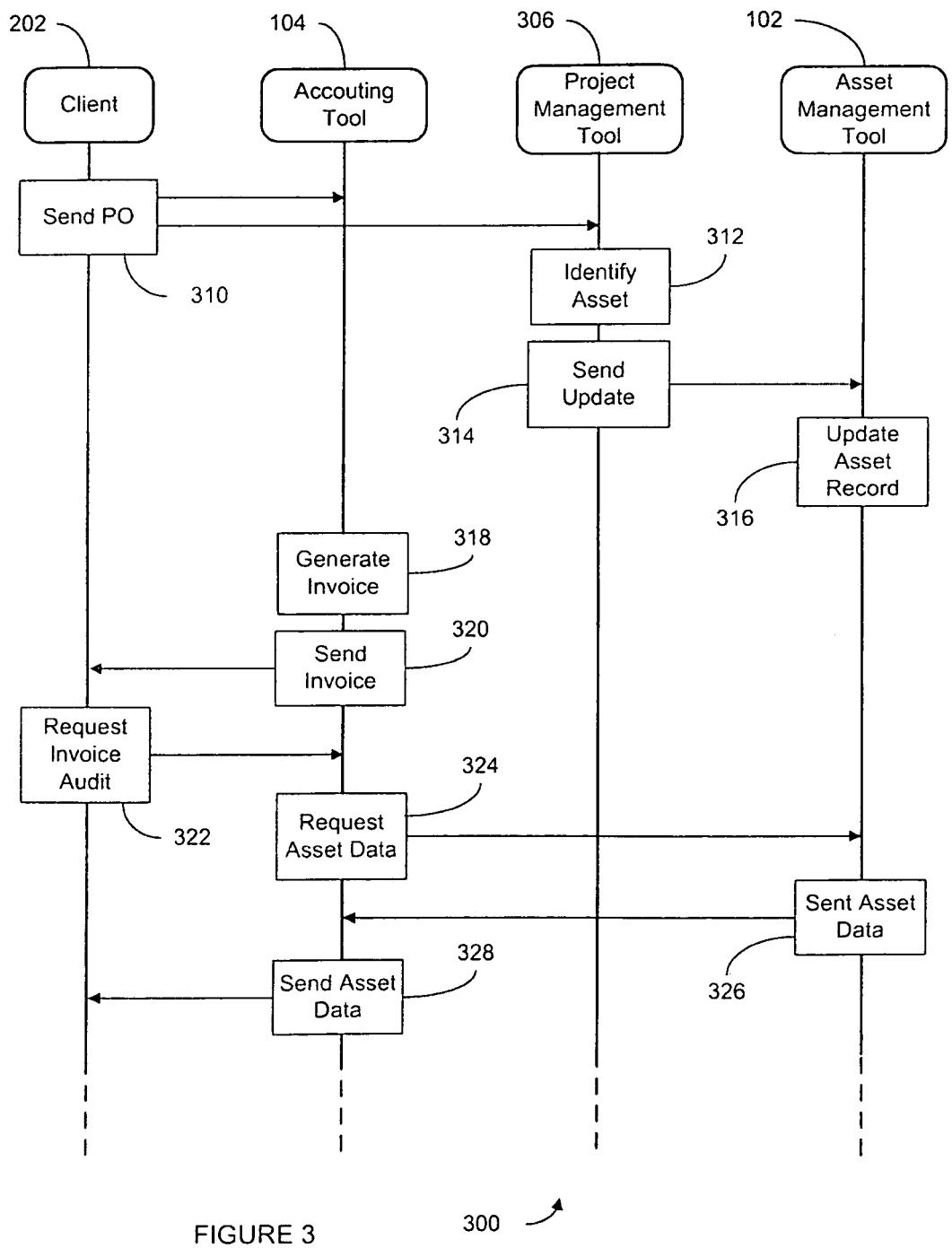
FIG. 3 is a signaling diagram illustrating an example implementation of asset verification.

FIG. 3 is a signaling diagram 300 illustrating an example implementation of asset verification. The signaling diagram 300 illustrates an example timeline of communication among a client 202, an accounting tool 104, a project management tool 306, and an asset management tool 102. Each of the illustrated entities can exchange information using an automated communication protocol. For example, the entities may communicate over the network 106 of FIG. 1 using a TCP/IP protocol or a different communication protocol. In some cases, two or more of the entities are communicatively coupled over the Internet, a private network, or a different network (e.g., a LAN or a WAN). Communication can include wired (e.g., electrical, optical, and/or another) and/or wireless (e.g., radio frequency, infrared, and/or another) communication. Communication can include non-automated communication. For example, in some cases a purchase order, an invoice, and/or other data is communicated verbally or in a written request. Such data can then be converted to machine-readable format (e.g., by scanning and optical character recognition, manual entry, or another technique).

At 310, the client sends a client purchase order to the accounting tool 104 and/or to the project management tool 306. The project management tool 306 can manage the use of enterprise assets, for example, in order to fulfill a request included in a client purchase order. The project management tool 306 can represent a fully automated system, or in some cases, one or more aspects of the project management tool 306 operation are implemented manually, for example, by a project manager, an enterprise staff member, a technician, or another entity of the enterprise.

At 312, assets are identified in response to a request for goods or services included in the purchase order. The assets can be identified by the project management tool 306 (as illustrated in FIG. 3), by the asset management tool 102 (as illustrated in FIG. 2), or by another system or entity of the enterprise. The identified asset can be ordered from a vendor (as illustrated in FIG. 2). In some cases, the enterprise already has the identified assets and the assets do not need to be ordered. The identified assets are used to fulfill the request included in the purchase order.

At 314, an update is sent to the asset management tool 102. The update includes information related to usage of the specific asset in response to a request in the client purchase order. For example, the update can include a time and date of usage, a purchase order number for the client purchase order requesting the usage, identification of the client 202, and/or other data. At 316, the asset record associated with the identified asset is updated with the received usage data. In some cases, multiple different assets are used and/or a single asset is used multiple times to fulfill a single request in a purchase order. In such cases, operations 314 and 316 are repeated for each instance of usage of the one or more assets. As a result, a single asset record may indicate multiple instances of use of a specific asset against a specific purchase order number, and/or multiple different asset records may indicate an instance of use against a specific purchase order.

At 318, an invoice is generated to request payment from the client for the goods and services provided to the client 202 in response to the client purchase order. For example, the invoice may include a purchase order number, a description of the goods and services requested, a description of the goods and services provided, an amount of money requested from the client, an identification of a type of currency, a total project budget, and/or other information. The invoice may include information related to assets used to fulfill the client purchase order request. For example, the invoice may identify assets that were ordered and/or used to fulfill the request.

At 320, the invoice is sent to the client 202. At 322, the client 202 requests an invoice audit 322. The invoice audit request may request more specific information related to asset usage than is provided in the invoice. For example, the client 202 may request an identification of a location of the assets purchased by the enterprise in response to the purchase order, or the client 202 may request an identification of the time and date of each instance of usage of enterprise assets to fulfill the purchase order request.

At 324, the accounting tool 104 requests asset data from the asset management tool 102. For example, the accounting tool 104 can send the asset management tool 102 identification of a purchase order number and a request to identify all asset records associated with the purchase order number. The accounting tool 104 may also send invoice data to the asset management tool 102. In response, the asset management tool 102 can search for all asset records that indicate usage against the purchase order number. At 326, the asset management tool 102 provides the asset data to the accounting tool 104. The asset data sent to the accounting tool 104 can include the information identified in a search performed by the asset management tool 102. The asset management tool 102 and/or the accounting tool 104 can compare the asset data to the invoice data, for example, to verify the accuracy of the invoice data. The asset management tool 102 and/or the accounting tool 104 can compare the asset data to the client purchase order data, for example, to verify the accuracy of the invoice data. At 328, the accounting tool 104 sends the asset data to the client 202. In some cases, an audit report is generated based on the asset data, and the audit report is transmitted to the client 202. An audit report can include any data included in an asset record, including a history of asset usage, in addition to purchase order data and/or invoice data.

The illustrated signaling diagram 300 is an example implementation, and some implementations include one or more variations. For example, the invoice data can be verified before the invoice is sent to the client. That is to say, any and/or all of the operations 324, 326, and 328 can be performed before the operation 320.

Figure 4:
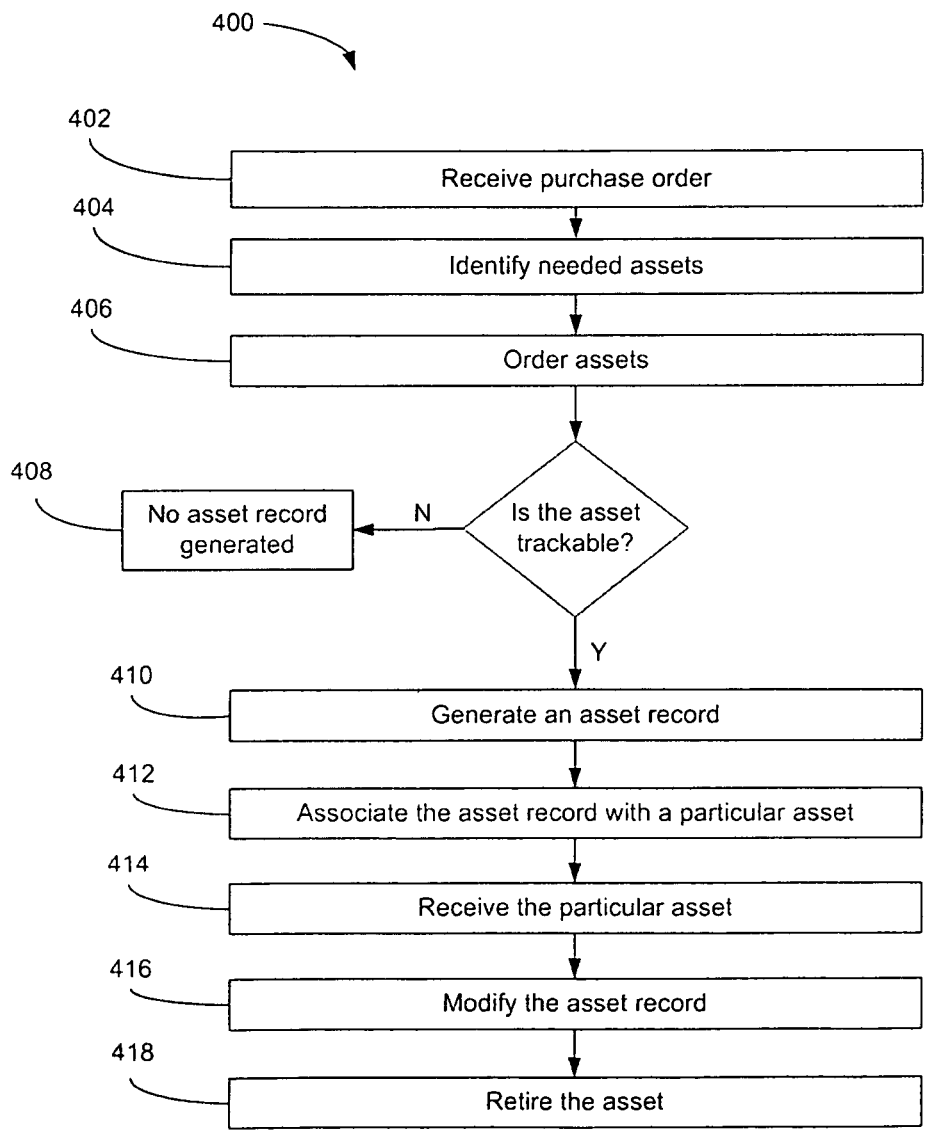
FIG. 4 is a flow chart illustrating an example process for asset tracking.

FIG. 4 is a flow chart illustrating an example process 400 for asset tracking. The process 400 can be used to track the deployment, usage, status, and/or other information related to enterprise assets. The process 400 can be implemented by the asset management tool 102 of FIG. 1. In some implementations, the process 400 includes the same, different, additional, or fewer operations performed in the same or a different order.

At 402, a client purchase order is received by the enterprise. For example, the client purchase order may include a specific request for a good and/or service of the enterprise. At 404, assets are identified. For example, the identified assets may be assets needed in order to fulfill a specific request included in the purchase order.

At 406, the identified assets are ordered. For example, multiple enterprise purchase orders, which include requests for the identified assets, may be sent to one or more vendors. If all asset is not a trackable asset, then no asset record is generated (408) for that asset. However, if an asset is trackable, at 410 an asset record is generated for the asset. The asset record includes information related to the ordered asset. For example, an asset record may include information included in the client purchase order received from the client and/or the enterprise purchase order sent to the vendor.

At 412, the asset record is associated with a particular asset. For example, a serial numbered or some other information specific to a particular asset, may be included in the asset record. The information specific to the particular asset can be received from the vendor, from a courier or a shipper, or another entity. For example, a shipping company may inform the enterprise (e.g., by telephone, email, fax, or another type of communication) of a delivery date for the particular asset. The delivery date can be included in the asset record to associate the asset record with the particular asset.

At 414, the particular asset is received by the enterprise. In the example, the courier or shipper delivers the asset to an enterprise shipping receiving location. At 416, the asset record is modified based on information about the particular asset. For example, the asset record may be updated to indicate additional specific information about the particular received asset, such as a serial number, a delivery date or location, and/or other data. In some cases the asset is allocated, and the asset record is updated based on the allocation of the asset. The asset record can be periodically and/or automatically updated to maintain an auditable record of use and/or deployment of the particular asset in the enterprise. The asset record can be used to generate reports and/or to display information about the particular asset. The asset record can be used to generate an audit report including information collected over the time since the particular asset was received by the enterprise.

At 418, the particular asset is retired. For example, the particular asset may be sold or decommissioned when it no longer functions as intended, when it is no longer needed for enterprise operations, when it becomes obsolete, when it is sold by the enterprise, or at another time. The asset record may be updated to indicate a retired status of the particular asset.

Figure 5:
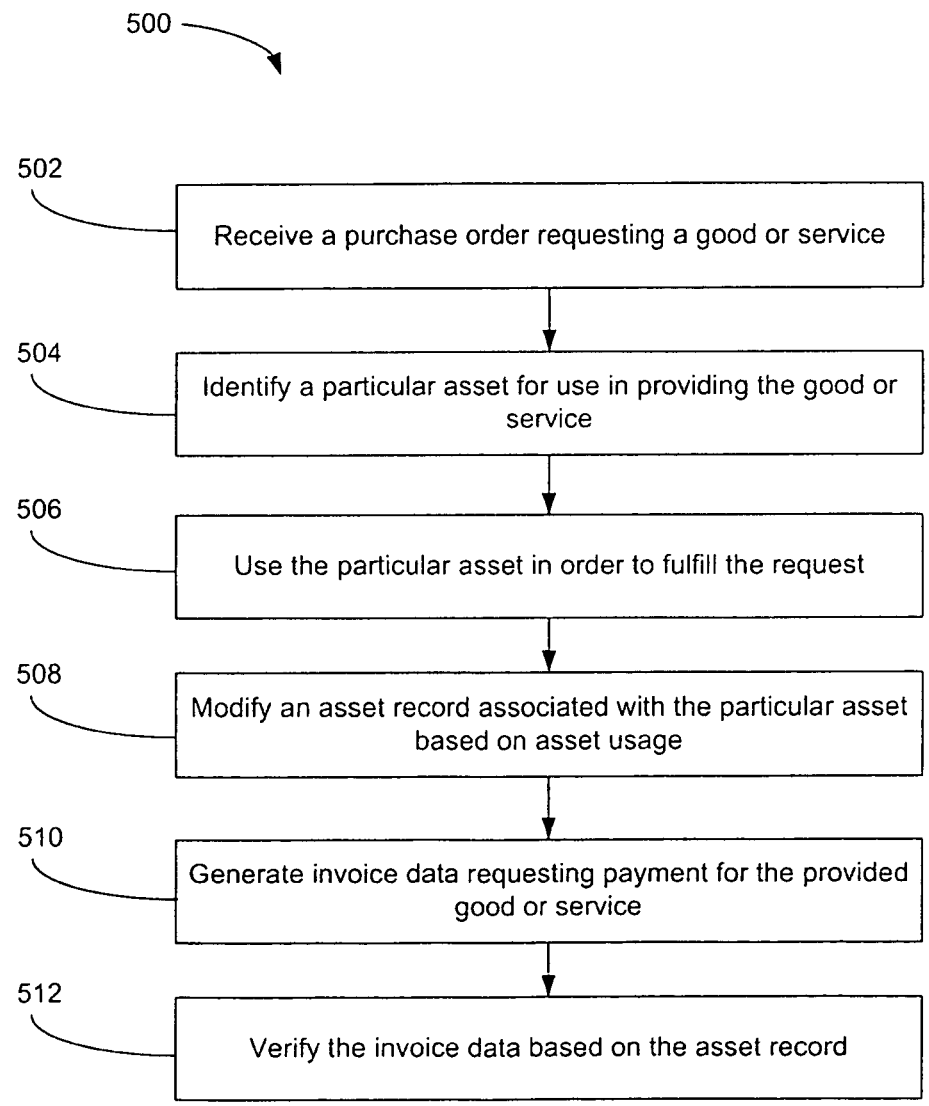
FIG. 5 is a flow chart illustrating an example process for asset verification.

FIG. 5 is a flow chart illustrating an example process 500 for asset verification. The process 500 can be used to verify invoice data based on an asset record and/or a purchase order. The process 500 can be implemented by the asset management tool 102 and/or the accounting tool 104 of FIG. 1. In some implementations, the process 500 includes the same, different, additional, or fewer operations performed in the same or a different order.

At 502, a client purchase order is received. The client purchase order includes a request from a client for a good or service provided by the enterprise. For example, the request may be a line item in the client purchase order. A purchase order number is associated with the client purchase order. At 504, a particular asset is identified for use in providing the requested good or service. For example, if the purchase order requests printing of 5,000 brochures, one or more particular printers and/or ink cartridges for printing the 5,000 brochures is identified.

At 506, the particular asset is used to fulfill the request included in the purchase order. Continuing the example, the brochures are printed by the particular printer that was identified based on the client purchase order. At 508, an asset record associated with the asset is modified based on the usage of the asset. For example, an asset record associated with the particular printer is modified after the 5,000 brochures have printed. In some implementations, the asset record is modified to include an identification of the client purchase order number and/or other information. In the example, the asset record can be modified to indicate the purchase order number, the number of brochures printed, the amount of time spent printing the brochures, a number of toner or ink colors used to print the brochures, a technician who supervised the printing, and/or other data.

At 510, invoice data is generated. The invoice data can be included in an invoice requesting payment for the good or service provided in response to the request included in the purchase order. At 512, the invoice data is verified based on the asset record. In some cases, the invoice data is verified before the invoice is sent to the client. Verifying the invoice data can include searching for all asset records that include identification of the purchase order number. The invoice data can then be compared to the information in the asset records. In some cases, multiple asset records are identified, and information is collected from all of the identified asset records. The collected information can then be transmitted to the client, or used by the enterprise for further analysis of the invoice. For example, the asset record data can be used to determine if the client is being over-billed or under-billed. Verifying the invoice data can include identifying at least one specific time when the particular asset was used in providing the good or the service. Verifying the invoice data can include verifying the accuracy of a purchase order number, a date of the asset usage, a currency type, a currency amount, and/or a total contract value. In some cases, the invoice data is modified based on a result of verifying the invoice data. For example, if an inaccuracy or a mistake in the invoice data is uncovered, then the invoice data may be modified. In some cases a report is generated to provide details of the usage of the particular asset based on the asset record.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus. e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing on re computer programs to perform functions of the invention by operating on input data and generating output. The processes and logic flows can also be performed by, and apparatus of the invention can be implemented as, special purpose logic circuitry. e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by ally form or medium of digital data communication, e.g., a communication network. Examples of communication networks include a local area network ("LAN") and a wide area network ("WAN"). e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. Accordingly, other implementations are within the scope of the following claims.

What is claimed is:

1. A method for verifying use of an asset in an enterprise, the method comprising:
   providing a processor having a memory adapted to store an electronic asset record associated with a particular asset of an enterprise;
   receiving a purchase order requesting a good or a service of said enterprise;
   identifying a particular asset for use in providing the good or the service;
   modifying said electronic asset record to include information relating to the purchase order;
   generating invoice data for requesting payment for the good or the service requested in the purchase order; and
   verifying the invoice data based at least in part on the modified electronic asset record.

2. The method of claim 1, wherein the information relating to the purchase order comprises a purchase order number associated with the purchase order, the method further comprising searching for the asset record based on the purchase order number.

3. The method of claim 1, wherein modifying the electronic asset record comprises:
   generating the electronic asset record; and
   storing the information relating to the purchase order in the electronic asset record.

4. The method of claim 1, wherein modifying the electronic asset record comprises including in the electronic asset record at least one of a date associated with the usage, a time associated with the usage, an enterprise entity associated with the usage, a result of the usage, or an authorizer of the usage.

5. The method of claim 1, wherein verifying the invoice data comprises identifying at least one specific time when the particular asset was used in providing the good or the service.

6. The method of claim 1, wherein verifying the invoice data comprises comparing the invoice data to at least one of data included in the modified electronic asset record or data included in the purchase order.

7. The method of claim 1, wherein the invoice data is verified in response to a request received from a client that submitted the purchase order.

8. The method of claim 1, further comprising generating a report providing details of the usage of the particular asset based on the electronic asset record.

9. The method of claim 1, wherein verifying the invoice data comprises verifying the accuracy of at least one of a purchase order number, a date of the asset usage, a currency type, a currency amount, or a total contract value.

10. The method of claim 1, further comprising issuing an alert when an inaccuracy is identified in the invoice data.

11. The method of claim 1, wherein the invoice data is generated in response to receiving a goods or services receipt notification.

12. A computer program product, tangibly stored on a computer-readable medium, comprising instructions operable to cause a programmable processor to:
   receive a purchase order requesting a good or a service of an enterprise;
   identify a particular asset for use in providing the good or the service;
   modify an electronic asset record associated with the particular asset to include information relating to the purchase order;
   generate invoice data for requesting payment for the good or the service requested in the purchase order; and
   verify the invoice data based at least in part on the modified electronic asset record.

13. The computer program product of claim 12, wherein the instructions operable to cause the programmable processor to verify the invoice data comprise instructions operable to cause the programmable processor to search for the electronic asset record based on information relating to the purchase order.

14. The computer program product of claim 12, wherein the instructions operable to cause the programmable processor to verify the invoice data comprise instructions operable to cause the programmable processor to identify the electronic asset record and a plurality of additional electronic asset records based on the information relating to the purchase order, the additional electronic asset records associated with a plurality of additional assets.

15. The computer program product of claim 12, further comprising instructions operable to cause the programmable processor to modify the invoice data based on a result of verifying the invoice data.

16. A system for verifying use of an asset in an enterprise, comprising:
   a memory adapted to store an electronic asset record associated with a particular asset of an enterprise; and
   a communication interface adapted to receive data comprising:
      purchase order data relating to a first request for a good or a service of the enterprise; and invoice data relating to a second request for payment for the good or the service provided in response to the first request, said invoice data being generated by said system; and a processor adapted to perform operations comprising:
modifying the electronic asset record to include information relating to the purchase order based on usage of the asset in response to the first request;
verifying the invoice data based at least in part on the modified electronic asset record.

17. The system of claim 16, wherein the communication interface is further operable to:
receive a request to verify the invoice data; and
transmit asset data in response to the request to verify the invoice data, the asset data comprising information relating to the usage of the asset.

18. The system of claim 16, wherein verifying the invoice data comprises identifying the electronic asset record based on a purchase order number identified in the electronic asset record.

19. The system of claim 16, wherein at least one of the purchase order data or the invoice data is received from an information system of the enterprise.

20. The system of claim 19, wherein the at least one of the purchase order data or the invoice data is received from the information system over a private network of the enterprise.

* * * * *

UNITED STATES PATENT AND TRADEMARK OFFICE
CERTIFICATE OF CORRECTION

| | | |
|---|---|---|
| PATENT NO. | : 8,566,182 B2 | Page 1 of 1 |
| APPLICATION NO. | : 12/188090 | |
| DATED | : October 22, 2013 | |
| INVENTOR(S) | : Cheryl Brower et al. | |

It is certified that error appears in the above-identified patent and that said Letters Patent is hereby corrected as shown below:

In the Specification

In column 1, line 2, below "ENTERPRISE ASSET MANAGEMENT" insert
-- CROSS-REFERENCE TO RELATED APPLICATION --.

Signed and Sealed this
Twenty-eighth Day of January, 2014

Michelle K. Lee
*Deputy Director of the United States Patent and Trademark Office*